(12) United States Patent
Acker

(10) Patent No.: US 9,613,110 B2
(45) Date of Patent: Apr. 4, 2017

(54) FAST SERIALIZATION FOR DATA TRANSFER

(71) Applicant: Michael Acker, Grossfischlingen (DE)

(72) Inventor: Michael Acker, Grossfischlingen (DE)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 14/568,864

(22) Filed: Dec. 12, 2014

(65) Prior Publication Data

US 2016/0171067 A1    Jun. 16, 2016

(51) Int. Cl.
*G06F 17/30*    (2006.01)
*G06F 7/00*    (2006.01)

(52) U.S. Cl.
CPC ............... *G06F 17/30557* (2013.01)

(58) Field of Classification Search
USPC ........................................... 707/627
See application file for complete search history.

(56) References Cited

U.S. PATENT DOCUMENTS

| 7,089,253 B2 * | 8/2006 | Hinshaw ........... G06F 17/30348 104/3 |
| 7,263,697 B2 | 8/2007 | Acker et al. |
| 7,406,695 B2 | 7/2008 | Dattke et al. |
| 7,870,549 B2 | 1/2011 | Acker et al. |
| 7,895,172 B2 * | 2/2011 | Cooper ............. G06F 17/30578 707/704 |
| 8,171,452 B2 | 5/2012 | Crasovan et al. |
| 8,533,692 B2 | 9/2013 | Crasovan et al. |
| 9,350,595 B1 * | 5/2016 | Yadav ............... H04L 29/06027 |
| 2004/0244012 A1 * | 12/2004 | Massarenti ........... G06F 9/4435 719/319 |
| 2006/0136702 A1 * | 6/2006 | Vantalon ................. G06F 21/16 713/1 |
| 2010/0162104 A1 | 6/2010 | Acker et al. |
| 2014/0180737 A1 | 6/2014 | Acker et al. |

OTHER PUBLICATIONS

Communication and extended European Search Report re EPO Application No. 15003418.9-1951, mailed Apr. 29, 2016; 10 pages.

(Continued)

*Primary Examiner* — Kuen Lu
(74) *Attorney, Agent, or Firm* — Fish & Richardson P.C.

(57) ABSTRACT

The present disclosure describes methods, systems, and computer program products for serializing data for data transfer. One computer-implemented method includes analyzing a column of data stored in the first database to determine at least one serialization parameter, the at least one serialization parameter comprises a repetition counter, a replication counter, or a variable type; determining a data serialization scheme associated with the data based on at least one of the repetition count or the replication counter; determining a variable serialization scheme associated with the data based on the variable type; repeating the analyzing, the determining of the data serialization scheme, and the determining of the variable serialization scheme; serializing the data stored in the first database using the data serialization scheme associated with the data and the variable serialization scheme associated with the data; and transferring the serialized data to the second database.

20 Claims, 12 Drawing Sheets

(56) References Cited

OTHER PUBLICATIONS

Abadi et al. "Integrating compression and execution in column-oriented database systems", ACM Proceedings of SIGMOD, International Conference on Managemen t of Data, Jun. 27, 2006, pp. 671-682, XP002485264.
Thomas Larock: "Does this Datatype Make my Column Look Fat?"; Sep. 4, 2012; XP005526030; Retrieved from Internet: URL: http://thomaslarock.com/2012/09/does-this-datatype-make-my-column-look-fat/ [retrieved on Mar. 22, 2016].

* cited by examiner

FAST SERIALIZATION FOR DATA TRANSFER

BACKGROUND

In general, when data is transferred from a source database to a target database, the transferred data are serialized before the transfer. The source database and the target database may be located in different nodes of a computer network, different storage components in one location, or a combination thereof. During the serialization process, the source system can read the data stored in the source database in sequence. The source system can then write serialized data to the transfer medium to transfer the data to the target system. The target system can read the transferred data from the transfer medium and deserialize the transferred data. In a deserialization process, the target system can create a target database and write the transferred data in sequence in the target database. In general, the writing sequence used during the deserialization process corresponds to the reading sequence used during the serialization process.

SUMMARY

The present disclosure relates to computer-implemented methods, computer-readable media, and computer systems for a serialization process in a data transfer operation. One computer-implemented method for improving data transferring efficiency from a first database to a second database includes analyzing a column of data stored in the first database to determine at least one serialization parameter, the at least one serialization parameter comprises a repetition counter, a replication counter, or a variable type; determining a data serialization scheme associated with the data based on at least one of the repetition count or the replication counter, wherein the data serialization scheme comprises at least one of a repetition scheme or a replication scheme; determining a variable serialization scheme associated with the data based on the variable type; repeating the analyzing, the determining of the data serialization scheme, and the determining of the variable serialization scheme for each column of the data stored in the first database; serializing the data stored in the first database using the data serialization scheme associated with the data and the variable serialization scheme associated with the data; and transferring the serialized data to the second database.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising: prior to the analyzing, determining whether the first database is a row-based database; and if the first database is row-based, transferring the first database into a column-based database.

A second aspect, combinable with any of the previous aspects, further comprising: compressing the serialized data; and transferring the compressed serialized data.

A third aspect, combinable with any of the previous aspects, wherein determining the data serialization scheme further comprising: if the repetition counter is smaller than a predetermined limit, determining that the data serialization scheme comprises the repetition scheme; and if the repetition counter is greater than or equal to the predetermined limit and the replication counter is larger than a predetermined threshold, determining that the data serialization scheme comprises the republication scheme.

A fourth aspect, combinable with any of the previous aspects, wherein determining the variable serialization scheme further comprising: if the variable type is integer, determining that the variable serialization comprises an integer scheme; and if the variable type is character, determining that the variable serialization comprises a character scheme.

A fifth aspect, combinable with any of the previous aspects, wherein the repetition scheme comprises: writing the repetition counter to a transfer medium; serializing at least one value in a value set to the transfer medium; determining an index that corresponds to a data value; and writing the index to the transfer medium.

A sixth aspect, combinable with any of the previous aspects, wherein the replication scheme comprises: setting an additional value counter to zero; writing a data value to a transfer medium; reading a next data value; in response to a determination that the next data value is equal to the data value, increasing the additional value counter by one; and writing the additional value counter to the transfer medium.

The subject matter described in this specification can be implemented in particular implementations so as to realize one or more of the following advantages. For example, the amount of data is reduced during the serialization/deserialization process. Therefore, the speed of data transfer is increased. The performance improvement may be significant when the access speed to the stored data is slow, e.g., when the data are stored on hard disk or in a remote location in a computer network, or when the transferred data are stored in large tables. Furthermore, in a fast network, tradeoff between compression time and data amount reduction may be evaluated to improve the overall performance of the data transfer.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

In some cases, compression schemes, e.g., ZIP or GZIP, may be used in data transfer to reduce the amount of data transferred. These compression schemes may use a lot of processor time. When the transferring speed on the transfer medium is fast, the time that is spared for transmission due to the reduced data amount may be offset by the time used to compress data. On the other hand, using fast serialization schemes to serialize data may reduce the amount of data during the serialization/deserialization process and therefore increase the data transfer speed with little or no additional processor time.

Sometimes, fast serialization schemes and compression schemes may be used selectively depending on the speed of the transfer medium. For example, on a Wide Area Network (WAN) with slow connections, compression schemes may be used because the compression rate may be higher without fast serialization. Conversely, on a fast transfer medium, e.g., a direct Local Area Network (LAN) connection, fast serialization schemes may be used. In some cases, fast serialization schemes may be used in combination with compression schemes, such as GZIP/ZIP, because fast serialization may reduce the time used to compress the fast-serialized data.

In some cases, fast serialization schemes can use the knowledge about data format, data content, or a combination thereof. The knowledge of data format may include character, integer, or other formats. The knowledge of data content may include minimal value, maximal value, value set, or dictionary. In some cases, this knowledge can be stored by the runtime system during the creation of tables in the source database. In some cases, this knowledge can be obtained during an analyzing process before serialization. During the analyzing process, it may be determined whether to use compression scheme, fast serialization schemes, or a combination thereof.

The overall time for transferring the values in data fields in a database may be expressed in a linear equation as the following:

$$t\text{sum} = nt1 + nt2 + ct3,$$

where n=Number of fields, c=Number of Columns, t1=Time needed to analyze one field, t2=Time needed to serialize one field, t3=Time needed to select a compression method per column, and tsum=Time needed to analyze and transfer the whole data.

Figure 1:
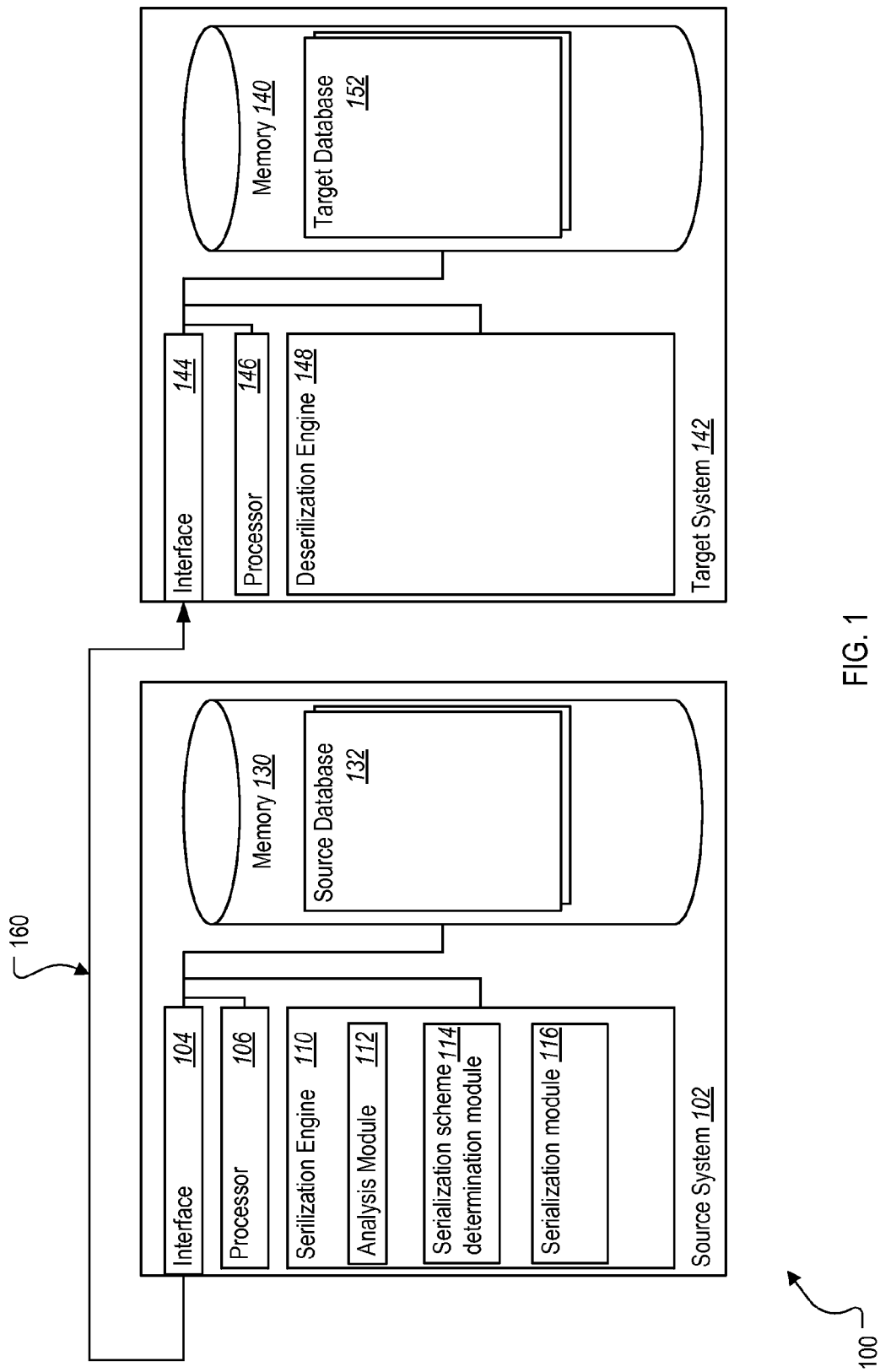
FIG. 1 is a high-level architecture block diagram illustrating a serialization system for data transfer according to an implementation.

FIG. 1 is a high-level architecture block diagram illustrating a serialization system 100 for data transfer according to an implementation. At a high level, the illustrated serialization system 100 includes a source system 102 that is communicably coupled with a target system 142 through a transfer medium 160. The described illustration is only one possible implementation of the described subject matter and is not intended to limit the disclosure to the single described implementation. Those of ordinary skill will appreciate the fact that the described components can be connected, combined, and used in alternative ways consistent with this disclosure.

The source system 102 represents any application, set of applications, software, software modules, hardware, or combination of software and hardware that can be used to store source database and to perform data serialization. In the illustrated example, the source system 102 includes an interface 104, a processor 106, a memory 130, and a serialization engine 110.

The memory 130 may include any memory or database module and may take the form of volatile or non-volatile memory including, without limitation, magnetic media, optical media, random access memory (RAM), read-only memory (ROM), removable media, or any other suitable local or remote memory component. The memory 130 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the source system 102. As illustrated, the memory 130 can store one or more source databases 132. The source databases 132 can be transferred to the target system 142 in a data transfer operation.

The serialization engine 110 represents any application, set of applications, software, software modules, hardware, or combination of software and hardware that can be used to perform data serialization. In the illustrated example, the serialization engine 110 includes an analysis module 112, a serialization scheme determination module 114, and a serialization module 116.

Figure 3A:
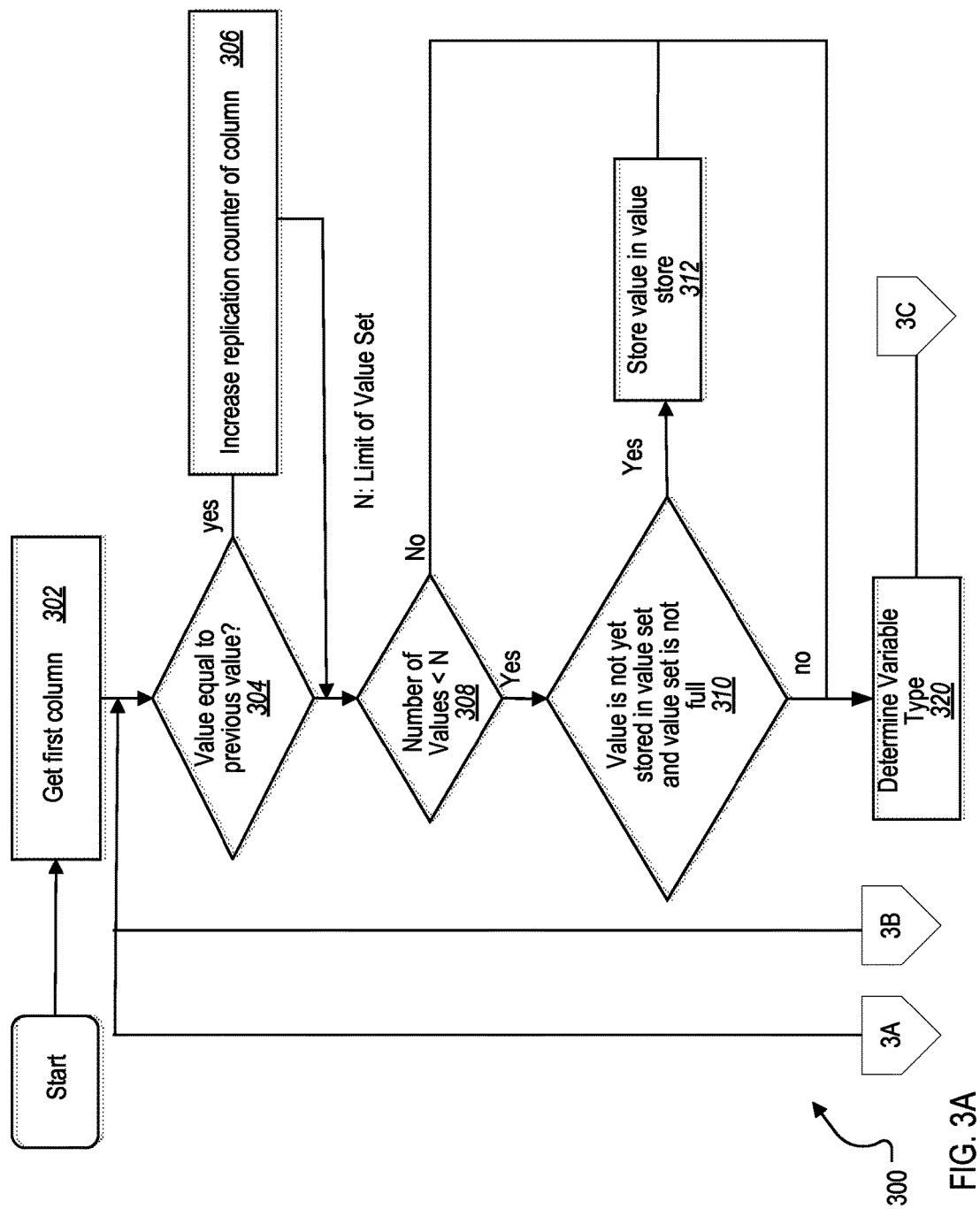
FIGS. 3A-3B are flow diagrams of a method illustrating an analyzing process according to an implementation.
Figure 3B:
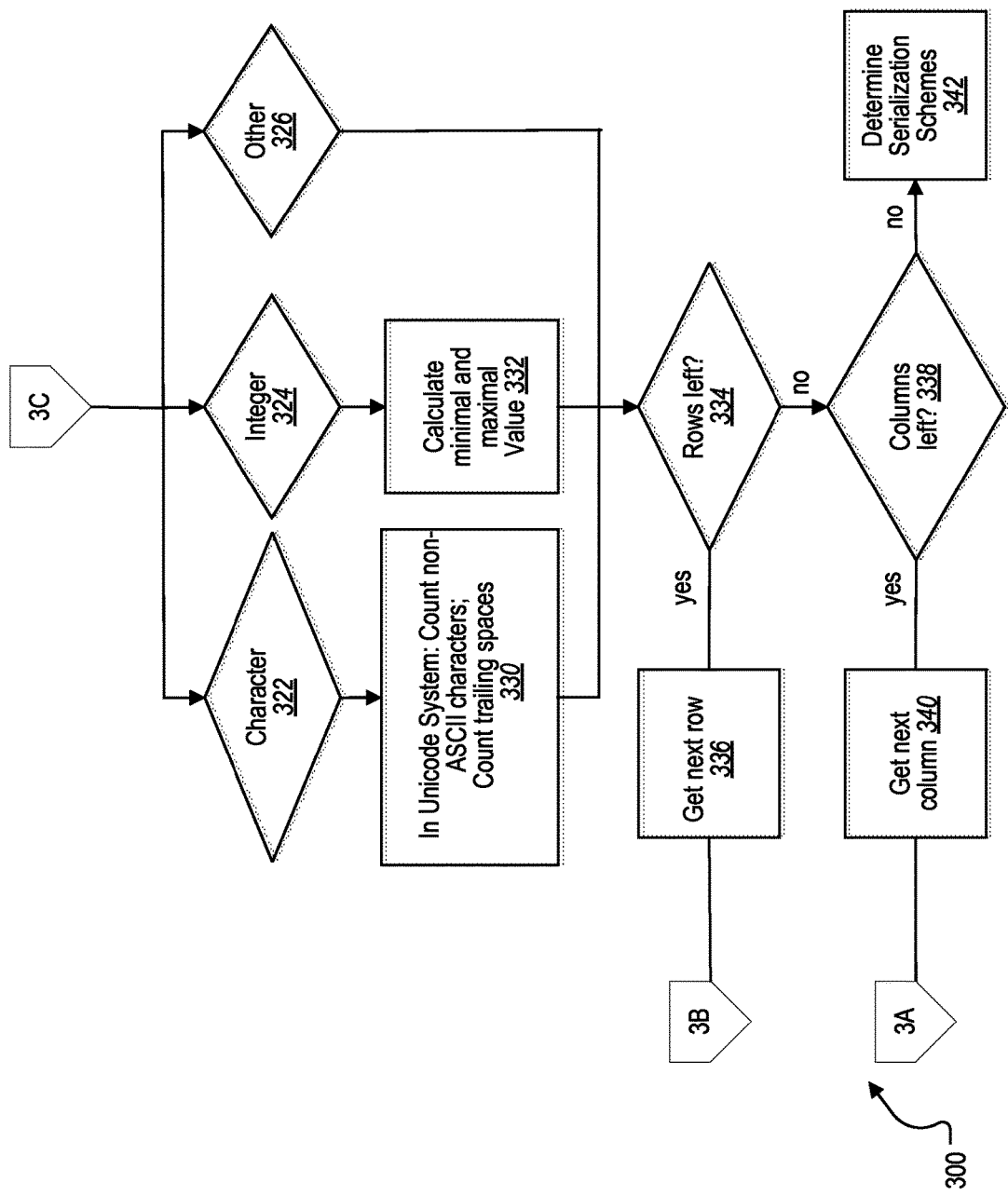

The analysis module 112 represents an application, set of applications, software, software modules, hardware, or combination of software and hardware that can be used to perform an analyzing process of the data in the source database. In some implementations, the analyzing process can be performed prior to the serialization. During the analyzing process, one or more serialization parameters can be determined. FIGS. 3A-3B and associated descriptions provide more details of the analyzing process.

Figure 4:
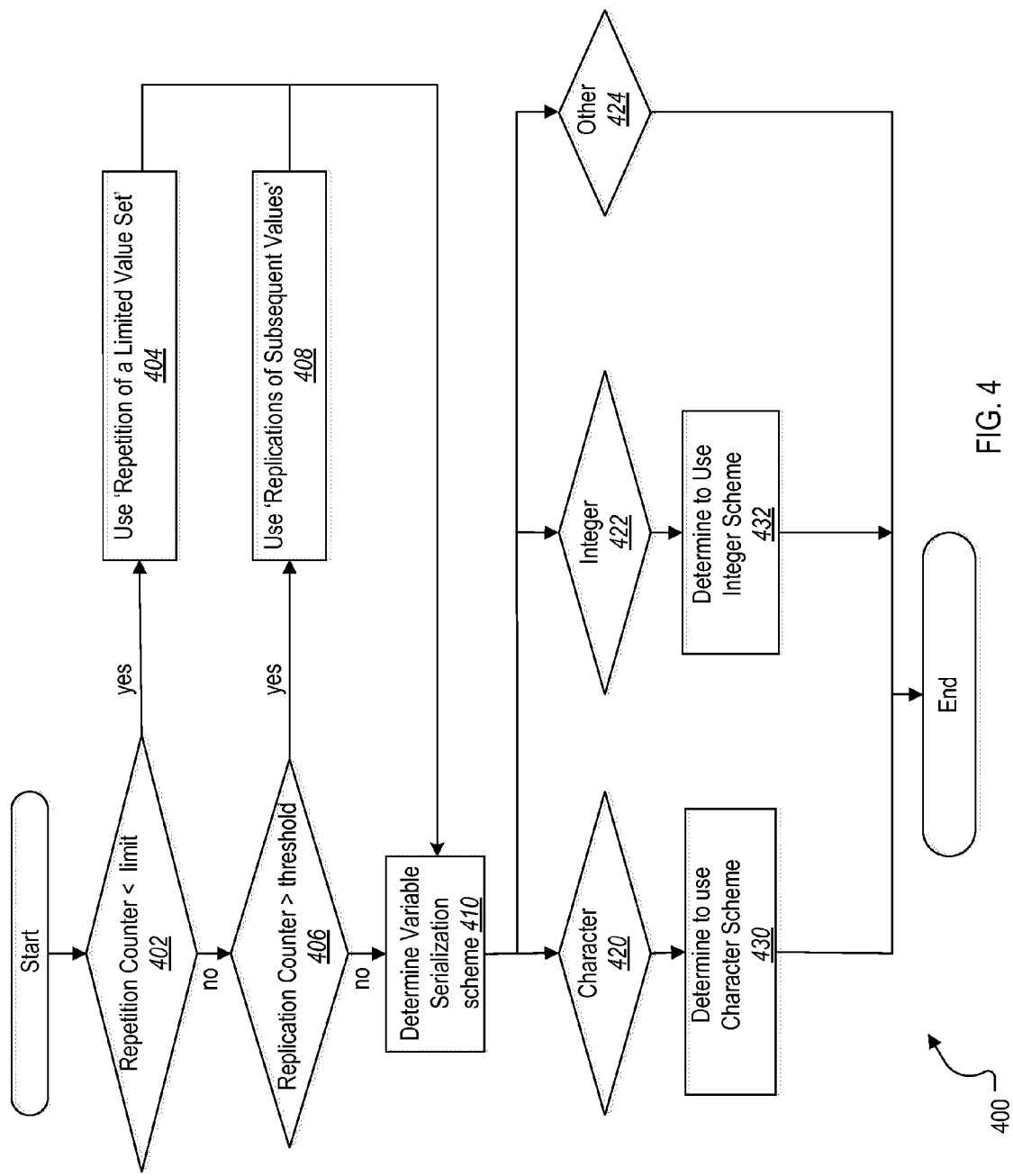
FIG. 4 is a flow diagram of a method illustrating a process for determining serialization schemes according to an implementation.

The serialization scheme determination module 114 represents an application, set of applications, software, software modules, hardware, or combination of software and hardware that can be used to determine one or more serialization schemes. In some implementations, the one or more serialization schemes can be determined based on the serialization parameters determined in the analyzing process. FIG. 4 and associated descriptions provide more details of the serialization scheme determination process.

The serialization module 116 represents an application, set of applications, software, software modules, hardware, or combination of software and hardware that can be used to perform the serialization process according to the serialization schemes determined by the serialization scheme determination module 114. FIGS. 5-11 and associated descriptions provide more details of the serialization process.

As illustrated in FIG. 1, the source system 102 includes a processor 106. Although illustrated as a single processor 106 in FIG. 1, two or more processors may be used according to particular needs, desires, or particular implementations of the system 100. Each processor 106 may be a central processing unit (CPU), an application-specific integrated circuit (ASIC), a field-programmable gate array (FPGA), or another suitable component. Generally, the processor 106 executes instructions and manipulates data to perform the operations of the source system 102. Specifically, the processor 106 executes the algorithms and operations described in the illustrated figures, including the operations performing the functionality associated with the source system 102, generally, as well as the various software modules. In some implementations, the processor 106 can execute data transfer after the serialization process. In some implementations, prior to the data transfer, the processor 106 can also execute data compression after the serialization process.

The interface 104 can be used by the source system 102 for communicating with other systems in a distributed environment connected to the transfer medium 160, e.g., the target system 142. Generally, the interface 104 comprises logic encoded in software and/or hardware in a suitable combination and operable to communicate with the transfer medium 160. More specifically, the interface 104 may comprise software supporting one or more communication protocols associated with communications such that the transfer medium 160 or interface's hardware is operable to communicate physical signals within and outside of the illustrated system 100.

The target system 142 represents any application, set of applications, software, software modules, hardware, or combination of software and hardware that can be used to receive transferred data from the source system 102 and perform deserialization. In the illustrated example, the target system 142 includes an interface 144, a processor 146, a memory 140, and a deserialization engine 148.

The memory 140 may include any memory or database module and may take the form of volatile or non-volatile memory including, without limitation, magnetic media, optical media, random access memory (RAM), read-only memory (ROM), removable media, or any other suitable local or remote memory component. The memory 140 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the target system 142. As illustrated, the memory 140 can store one or more target databases 152. The target databases 152 can be created based on the transferred data in a data transfer operation.

The deserialization engine 148 represents any application, set of applications, software, software modules, hardware, or combination of software and hardware that can be used to perform deserialization on the received data. FIGS. 5-11 and associated descriptions provide more details of the deserialization process.

As illustrated in FIG. 1, the target system 142 includes a processor 146. Although illustrated as a single processor 146 in FIG. 1, two or more processors may be used according to particular needs, desires, or particular implementations of the system 100. Each processor 146 may be a central processing unit (CPU), an application-specific integrated circuit (ASIC), a field-programmable gate array (FPGA), or another suitable component. Generally, the processor 146 executes instructions and manipulates data to perform the operations of the target system 142. Specifically, the processor 146 executes the algorithms and operations described in the illustrated figures, including the operations performing the functionality associated with the target system 142, generally, as well as the various software modules. In some implementations, the processor 146 can receive the transferred data before the deserialization process. In some implementations, the processor 146 can also decompress the received data prior to the deserialization process.

The interface 144 can be used by the target system 142 for communicating with other systems in a distributed environment connected to the transfer medium 160, e.g., the source system 102. Generally, the interface 144 comprises logic encoded in software and/or hardware in a suitable combination and operable to communicate with the transfer medium 160. More specifically, the interface 144 may comprise software supporting one or more communication protocols associated with communications such that the transfer medium 160 or interface's hardware is operable to communicate physical signals within and outside of the illustrated system 100.

The transfer medium 160 facilitates communications between the components of the system 100 (e.g., between the source system 102 and the target system 142). In some implementations, the transfer medium 160 can be a memory pipe between the source system 102 and the target system 142. In some cases, the transfer medium 160 can be a wireless or a wireline network. In some cases, the transfer medium 160 can be a file-transfer system that transfers database from one location to another.

While portions of the software elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
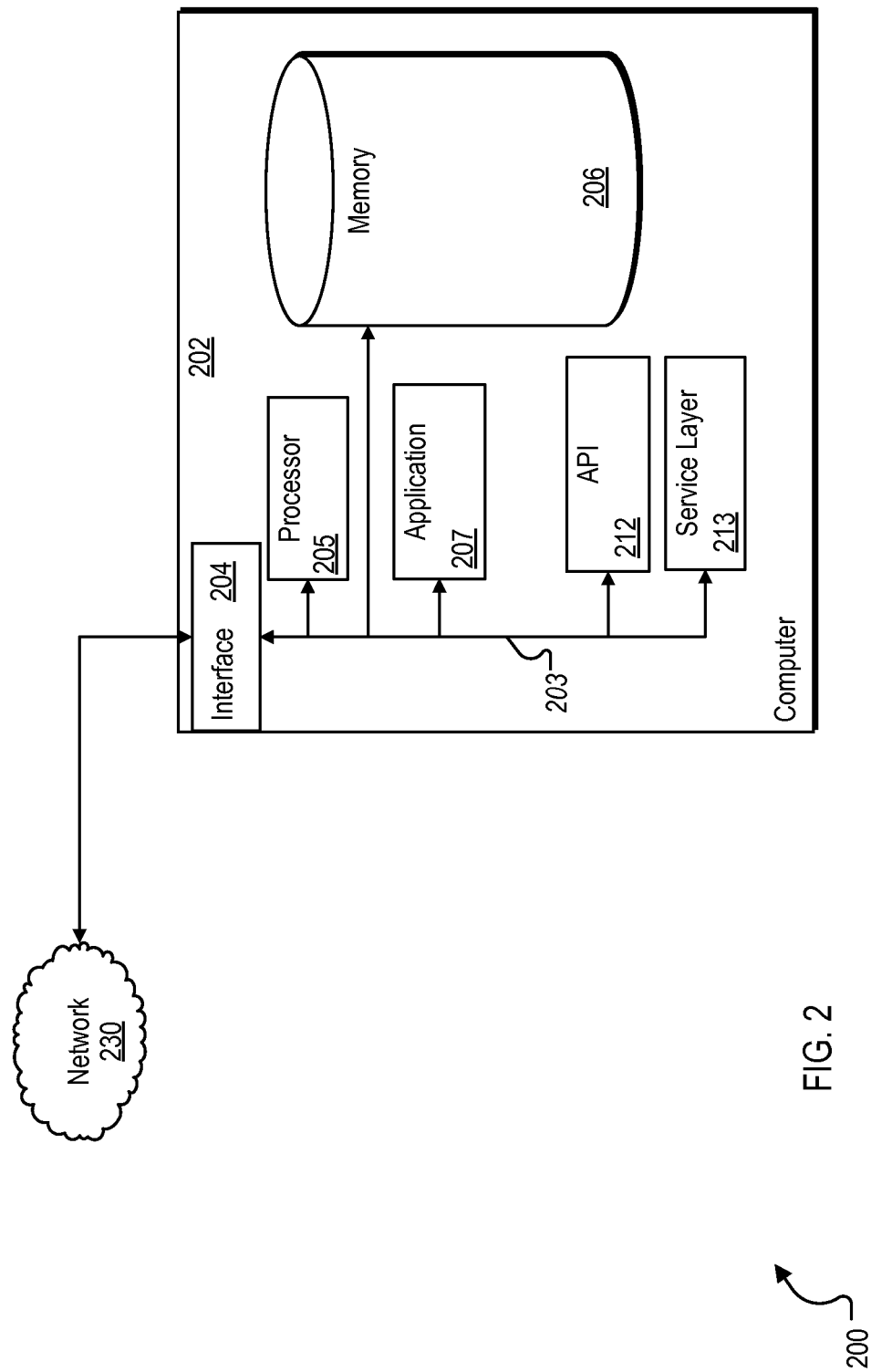
FIG. 2 is a block diagram of an exemplary computer used in a serialization system for data transfer according to an implementation.

FIG. 2 is a block diagram 200 of an exemplary computer used in a serialization system for data transfer according to an implementation. The illustrated computer 202 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 202 may comprise a computer that includes an input device, such as a keypad, keyboard, touch screen, or other device that can accept user information, and an output device that conveys information associated with the operation of the computer 202, including digital data, visual and/or audio information, or a GUI.

The computer 202 can serve as a client, network component, a server, a database or other persistency, and/or any other component of the serialization system 100. The illustrated computer 202 is communicably coupled with a network 230. In some implementations, one or more components of the computer 202 may be configured to operate within a cloud-computing-based environment.

At a high level, the computer 202 is an electronic computing device operable to receive, transmit, process, store, or manage data and information associated with the serialization system 100. According to some implementations, the computer 202 may also include or be communicably coupled with an application server, e-mail server, web server, caching server, streaming data server, business intelligence (BI) server, and/or other server.

The computer 202 can receive requests over network 230 from a client application (e.g., executing on another computer 202) and respond to the received requests by processing the said requests in an appropriate software application. In addition, requests may also be sent to the computer 202 from internal users (e.g., from a command console or by another appropriate access method), external or third parties, other automated applications, as well as any other appropriate entities, individuals, systems, or computers.

Each of the components of the computer 202 can communicate using a system bus 203. In some implementations, any and/or all the components of the computer 202, both hardware and/or software, may interface with each other and/or the interface 204 over the system bus 203 using an application programming interface (API) 212 and/or a service layer 213. The API 212 may include specifications for routines, data structures, and object classes. The API 212 may be either computer language-independent or -dependent and refer to a complete interface, a single function, or even a set of APIs. The service layer 213 provides software services to the computer 202 and/or the serialization system 100. The functionality of the computer 202 may be accessible for all service consumers using this service layer. Software services, such as those provided by the service layer 213, provide reusable, defined business functionalities through a defined interface. For example, the interface may be software written in JAVA, C++, or other suitable language providing data in Extensible Markup Language (XML) format or other suitable format. While illustrated as an integrated component of the computer 202, alternative implementations may illustrate the API 212 and/or the service layer 213 as stand-alone components in relation to other components of the computer 202 and/or serialization system 100. Moreover, any or all parts of the API 212 and/or the service layer 213 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202 and/or serialization system 100. The interface 204 is used by the computer 202 for communicating with other systems in a distributed environment—including within the serialization system 100—connected to the network 230 (whether illustrated or not). Generally, the interface 204 comprises logic encoded in software and/or hardware in a suitable combination and operable to communicate with the network 230. More specifically, the interface 204 may comprise software supporting one or more communication protocols associated with communications such that the network 230 or interface's hardware is operable to communicate physical signals within and outside of the illustrated serialization system 100.

The computer 202 includes a processor 205. Although illustrated as a single processor 205 in FIG. 2, two or more processors may be used according to particular needs, desires, or particular implementations of the computer 202 and/or the serialization system 100. Generally, the processor 205 executes instructions and manipulates data to perform the operations of the computer 202. Specifically, the processor 205 executes the functionality required for data serialization.

The computer 202 also includes a memory 206 that holds data for the computer 202 and/or other components of the serialization system 100. Although illustrated as a single memory 206 in FIG. 2, two or more memories may be used according to particular needs, desires, or particular implementations of the computer 202 and/or the serialization system 100. While memory 206 is illustrated as an integral component of the computer 202, in alternative implementations, memory 206 can be external to the computer 202 and/or the serialization system 100.

The application 207 is an algorithmic software engine providing functionality according to particular needs, desires, or particular implementations of the computer 202 and/or the serialization system 100, particularly with respect to functionality required for data serialization. For example, application 207 can serve as one or more components/applications described in FIGS. 1-3. Further, although illustrated as a single application 207, the application 207 may be implemented as multiple applications 207 on the computer 202. In addition, although illustrated as integral to the computer 202, in alternative implementations, the application 207 can be external to the computer 202 and/or the serialization system 100.

There may be any number of computers 202 associated with, or external to, the serialization system 100 and communicating over network 230. Further, the terms "client," "user," and other appropriate terminology may be used interchangeably as appropriate without departing from the scope of this disclosure. Moreover, this disclosure contemplates that many users may use one computer 202, or that one user may use multiple computers 202.

In some implementations, prior to serializing the data in the source database, a serialization engine can determine whether the source database is a row-based database or a column-based database. If the source database is a row-based database, the serialization engine can perform a column-based transfer. This approach can help other serialization schemes to get better results because similar data are stored close to each other. This approach can be more beneficial when data are serialized and compressed block-wise with a high compression ratio. The following tables represent a comparison between a row-based database and a column-based database.

TABLE 1

Row-based Database

| | | | |
|---|---|---|---|
| V11 | V21 | V31 | V41 |
| V12 | V22 | V31 | V41 |
| V13 | V21 | V31 | V41 |
| V14 | V22 | V32 | V41 |
| V15 | V21 | V32 | V41 |

TABLE 1-continued

Row-based Database

| V16 | V22 | V32 | V41 |
| V17 | V21 | V33 | V41 |
| V18 | V22 | V33 | V41 |

Table 1 represents an example of a row-based database, where data are stored row by row. In some cases, a first block of data can include 16 data entries, which occupy the first four rows in a table in the database. In the first block, there are three V31, four V41, two V21, two V22, three V31, one V32, four V41, and one each for V11-V14. A second block of data can include the data in the second four rows, where there are two V32, two V33, four V41, two V21, two V22, and one each for V15-V18. Therefore, the first block has 11 different data values and the second block has 9 different data values.

TABLE 2

Column-based Database

| V11 | V21 | V31 | V41 |
| V12 | V22 | V31 | V41 |
| V13 | V21 | V31 | V41 |
| V14 | V22 | V32 | V41 |
| V15 | V21 | V32 | V41 |
| V16 | V22 | V32 | V41 |
| V17 | V21 | V33 | V41 |
| V18 | V22 | V33 | V41 |

Table 2 represents an example of a column-based database, where data are stored column by column. In some cases, a first block of data can also include 16 data entries, which occupy the first two columns in the table. Here, the first block includes one each for V11-V18, four V21, and four V22. The second block of data can include the data in the second two columns in the table, where there are three V31, three V32, two V33, and eight V41. Therefore, the first block has 10 different data values and the second block has 4 different data values. By transferring the source database from a row-based database to a column-based database, the numbers of different data values in each block are reduced.

In some cases, column-based transfer can be performed by reading the data column by column in a row-based database prior to serialization. In some cases, data in the source database are stored in memory, and the serialization engine may jump in the memory to read data column by column. This may lead to additional page faults and additional time to read paged-out memory back from hard disk or to fill memory cache. However, the additional time may be negligible if the medium that is used to store or transfer the data is slower than the main memory, e.g., when the serialization is performed for a network transfer or a hard disk transfer.

FIGS. 3A-3B are flow diagrams of a method 300 illustrating an analyzing process according to an implementation. For clarity of presentation, the description that follows generally describes method 300 in the context of FIGS. 1-2 and 4-11. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

In some implementations, data in the source database are analyzed to determine one or more serialization parameters. These serialization parameters can include a repetition counter, a replication counter, and a variable type. These serialization parameters can also include minimal value, maximal value, and value set of the data. In some cases, the analyzing process can be performed by reading the data once prior to serialization.

At 302, the first column can be gotten. In some cases, serialization parameters for the column can be initialized to zero. From 302, method 300 proceeds to 304, where whether the data in the next row of the first column has an equal value to the data in the previous row can be determined. If the data in the next row has the same value as the previous row, method 300 proceeds from 304 to 306, where the replication counter of the column can be increased by 1. From 306, method 300 proceeds to 308. If the data in the next row has a different value than the previous row, method 300 proceeds from 304 to 308.

At 308, the number of values in the value set can be compared with a predetermined limit of value set. In some cases, the predetermined limit of value set can represent the maximum number of different values that can be stored in a value set for the column. If the number of values in the value set is greater than or equal to the predetermined limit of value set, method 300 proceeds from 308 to 320. If the number of values in the value set is smaller than the predetermined limit of value set, method 300 proceeds from 308 to 310, where whether the value has been stored in the value set and whether the value set is full can be determined. If the value set is not full and the value has not been stored in the value set, method 300 proceeds to 312. At 312, the value can be stored in the value set. In some implementations, the repetition counter can be increased by 1. In some cases, the repetition counter can be increased by 1 when the value is equal to the previous value. From 312, method 300 proceeds to 320. If the value set is full or if the value has been stored in the value set, method 300 proceeds from 310 to 320.

At 320, the variable type of the data can be determined. In some cases, the variable type of the data can be character, integer, or other types. If the data is a character, method 300 proceeds from 320 to 322. From 322, method 300 proceeds to 330. At 330, the coding scheme of the character can be determined. The coding scheme can be either a Unicode system or non-Unicode system. If the coding scheme is a Unicode system, the number of non-ASCII characters can be counted. In addition, the number of trailing spaces can be counted. From 330, method 300 proceeds to 334.

If the data is an integer, method 300 proceeds from 320 to 324. From 324, method 300 proceeds to 332, where the minimal and maximal values can be calculated. From 324, method 300 proceeds to 334. If the data is not a character or an integer, method 300 proceeds from 320 to 326. From 326, method 300 proceeds to 334.

At 334, whether there are more rows in the column can be determined. If there are more rows in the column, method 300 proceeds from 334 to 336, where data in the next row can be gotten. From 336, method 300 proceeds to 304, where the data value in the next row can be compared to the data value in the previous row. If there are no more rows left in the column, method 300 proceeds from 334 to 338, where whether there are more columns in the source database can be determined. If there are more columns in the source database, method 300 proceeds from 338 to 340, where data in the next column can be gotten. From 340, method 300 proceeds to 304. If there are no more columns left in the source database, method 300 proceeds from 338 to 342, where serialization schemes are determined. FIG. 4 and associated descriptions provide more details on the process of determining serialization schemes. After 342, method 300 stops.

In some cases, the serialization schemes can be dependents of the data type (like time). In these or other cases, the analyzing process may be skipped. In some cases, the data are already read once in advance to check for correctness. In these or other cases, the determination of serialization parameters can be added to the check routine for correctness to reduce the time for analyzing.

In some cases, the analyzing process can be skipped for one or more columns because the relevant information of the data is already known from the runtime system of the software product. For example, the runtime system can store information like minimal value, maximal value, and value set when the data are created. The runtime system can also refer to a Data Dictionary, which may define limits, allowed values, and other restrictions of the data.

FIG. 4 is a flow diagram of a method 400 illustrating a process for determining serialization schemes according to an implementation. For clarity of presentation, the description that follows generally describes method 400 in the context of FIGS. 1-3 and 5-11. However, it will be understood that method 400 may be performed, for example, by any other suitable system, environment, software, and hardware, or a combination of systems, environments, software, and hardware as appropriate. In some implementations, various steps of method 400 can be run in parallel, in combination, in loops, and/or in any order.

In some cases, the serialization schemes can be determined for each column in the source database. In some cases, the serialization schemes can be determined based on the serialization parameters determined during the analyzing process. Alternatively or in combination, the serialization schemes can be determined based on the relevant information collected by the runtime system. In some cases, more than one serialization scheme can be determined for one column. For example, a data serialization scheme and a variable serialization scheme can be determined for one column.

Figure 9:
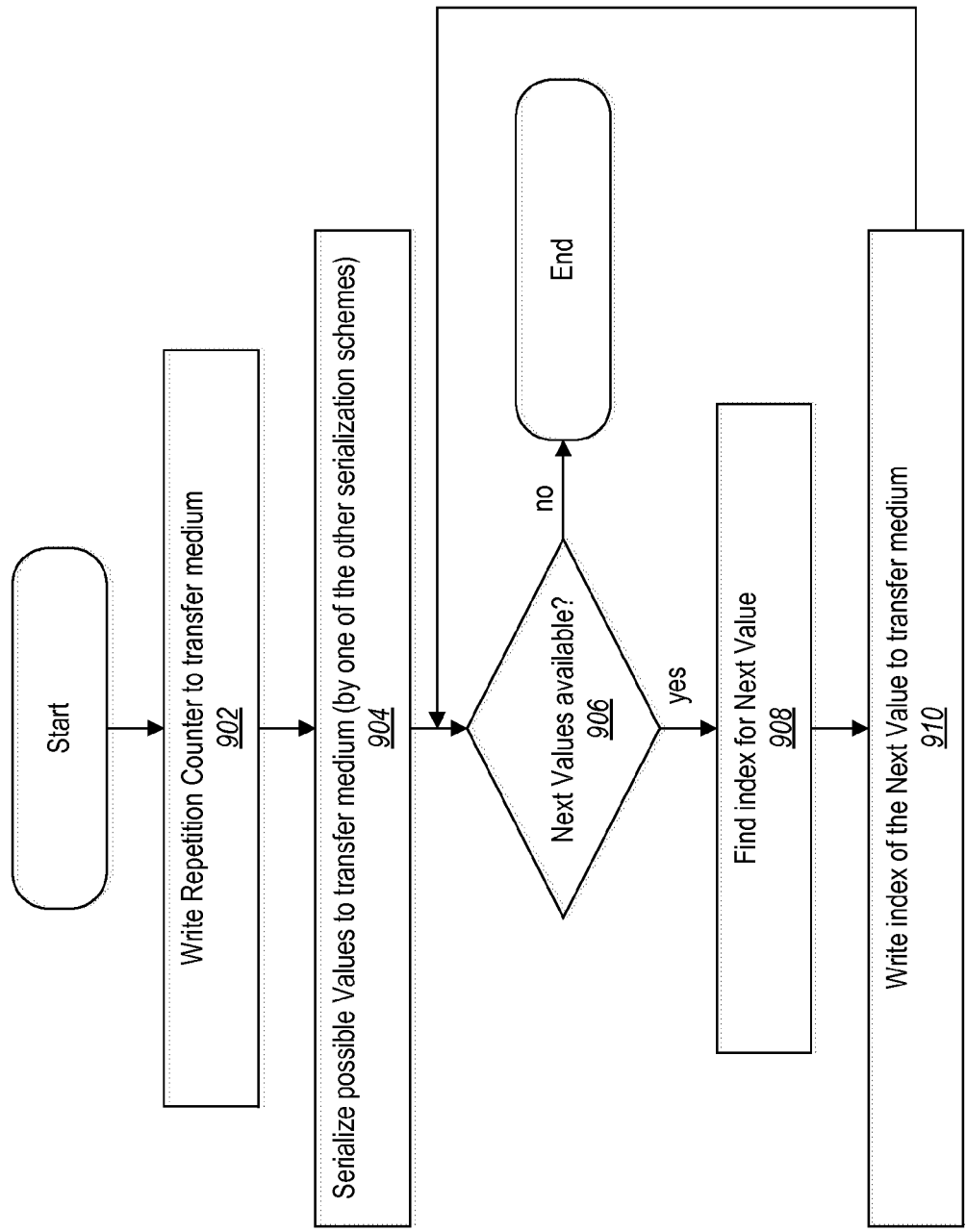
FIG. 9 is a flow diagram of a method illustrating a serialization process based on a repetition scheme according to an implementation.
Figure 10:
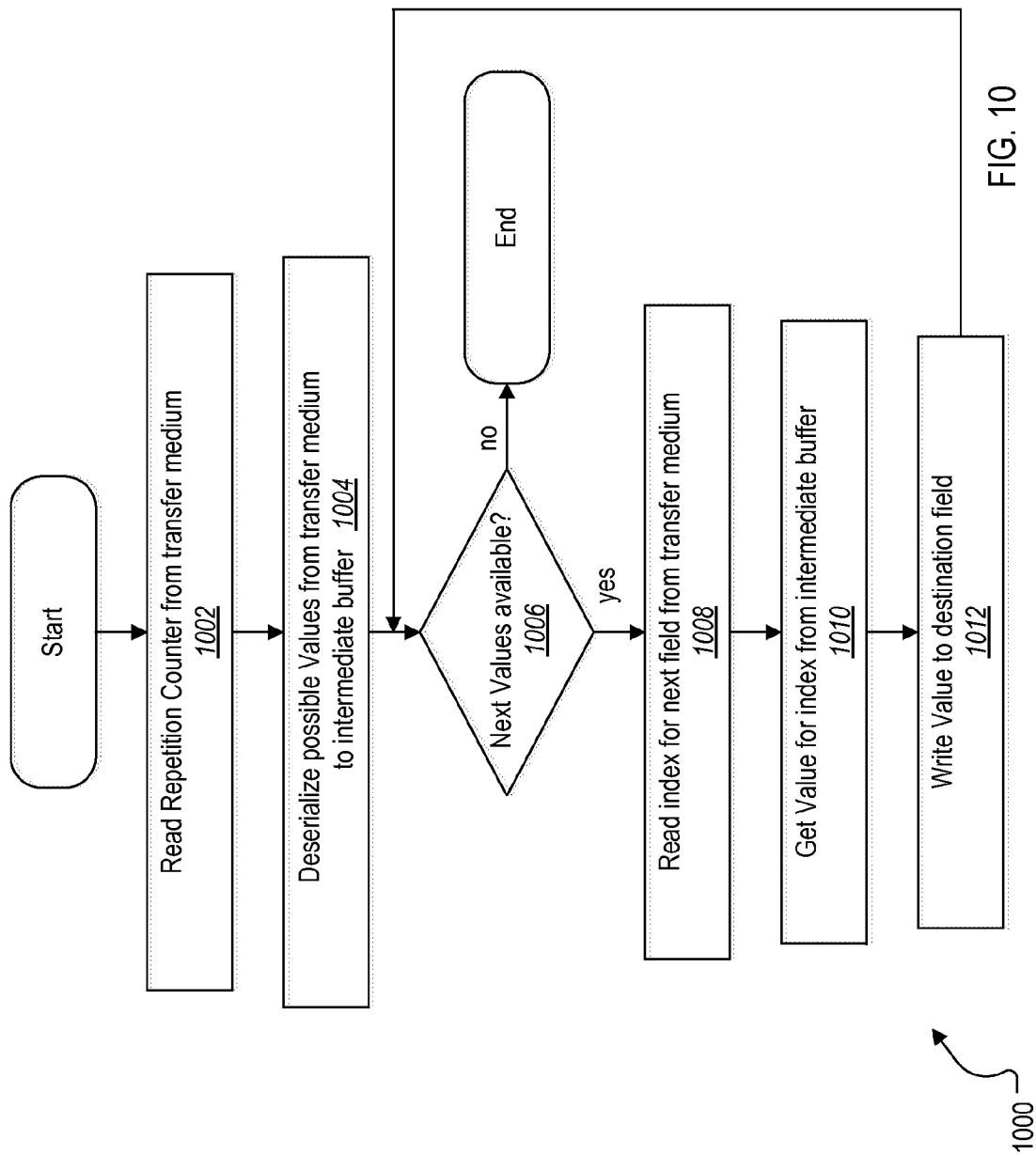
FIG. 10 is a flow diagram of a method illustrating a deserialization process based on a repetition scheme according to an implementation.

At 402, the repetition counter can be compared to a predetermined limit. In some cases, the repetition counter can represent the number of values in the value set of the column. If the repetition counter is smaller than the predetermined limit, method 400 proceeds from 402 to 404, where a repetition scheme can be determined as the data serialization scheme. FIGS. 9-10 and associated descriptions provide more details on the operation of the repetition scheme. From 404, method 400 proceeds to 410.

Figure 7:
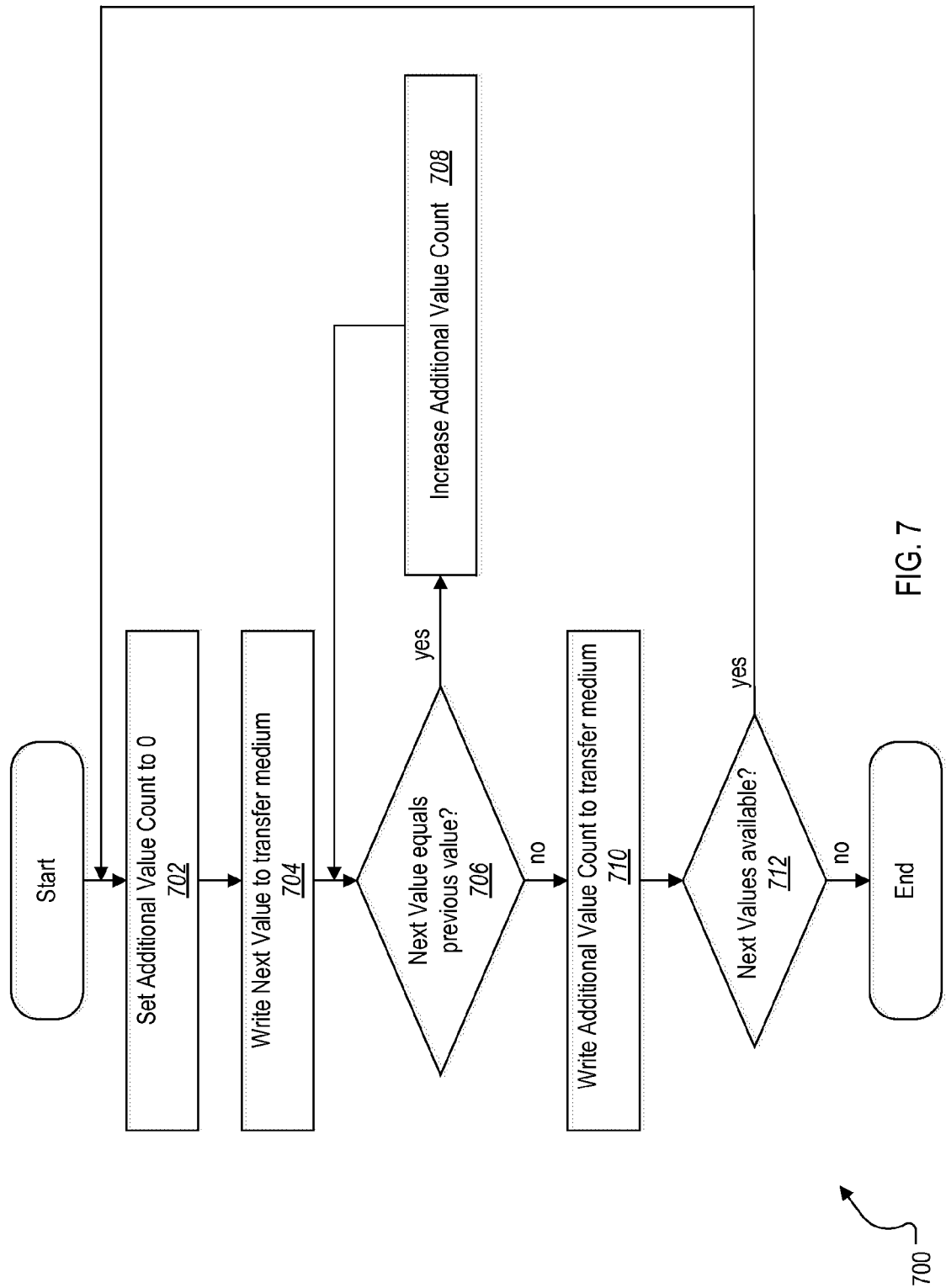
FIG. 7 is a flow diagram of a method illustrating a serialization process based on a replication scheme according to an implementation.
Figure 8:
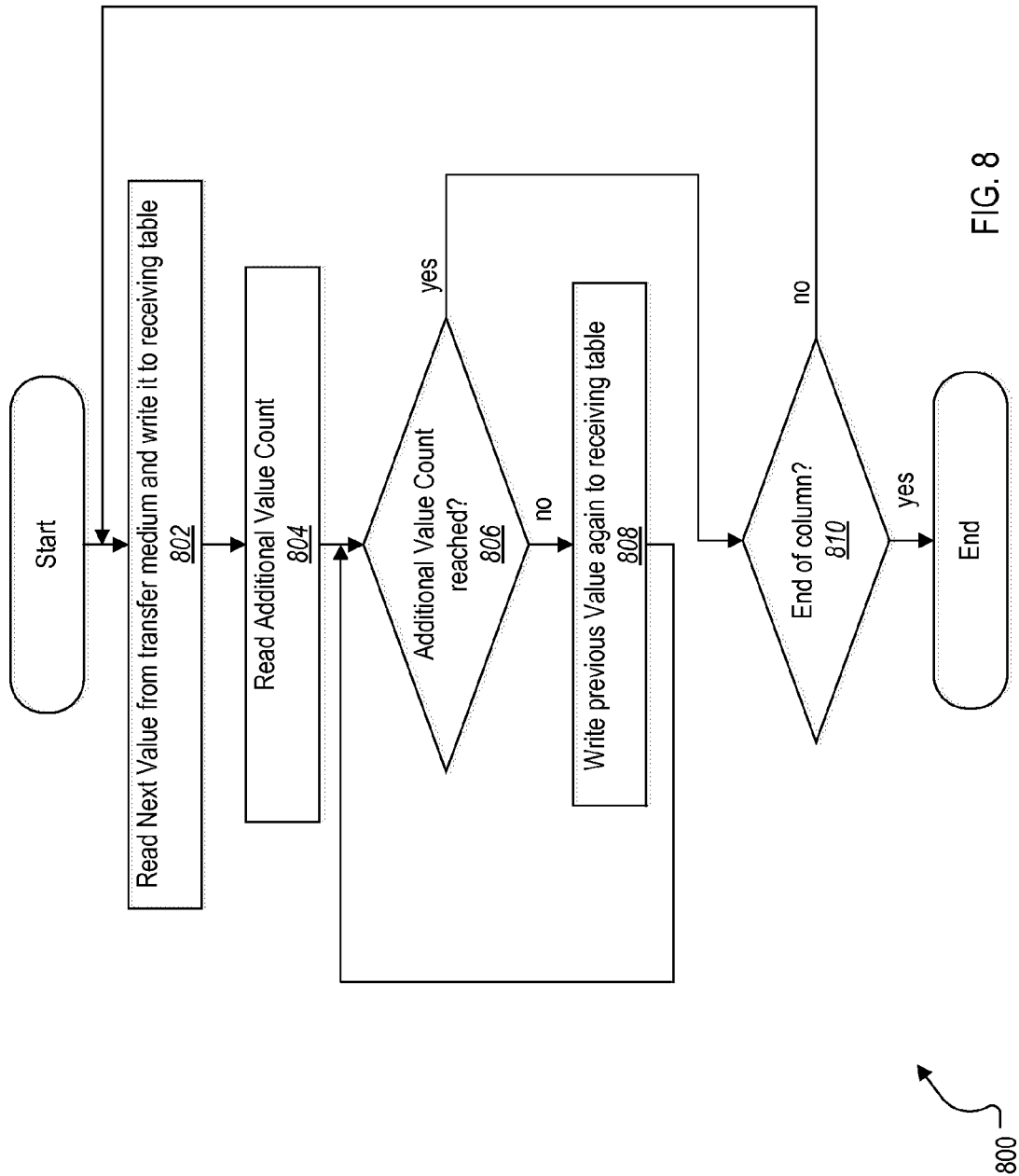
FIG. 8 is a flow diagram of a method illustrating a deserialization process based on a replication scheme according to an implementation.

If the repetition counter in a value set is larger than or equal to the predetermined limit N, method 400 proceeds from 402 to 406. At 406, the replication counter can be compared to a predetermined threshold. If the replication counter is larger than the predetermined threshold, method 400 proceeds from 406 to 408, where a replication scheme can be determined as the data serialization scheme. FIGS. 7-8 and associated descriptions provide more details on the operation of the replication scheme. From 408, method 400 proceeds to 410. If the replication counter is smaller than or equal to the predetermined threshold, method 400 proceeds from 406 to 410.

At 410, a variable serialization scheme can be determined for the column. In some cases, the variable serialization scheme can be determined based on the variable type of the column. If the variable type is character, method 400 proceeds from 410 to 420. From 420, method 400 proceeds to 430. At 430, a character scheme can be determined as the variable serialization scheme. In some cases, if the coding scheme is a Unicode system, the count of non-ASCII characters is compared with a predetermined threshold. If the count of non-ASCII characters is less than the predetermined threshold, UTF8 can be used. Otherwise, UTF16 can be used. In some cases, trailing spaces reduction can be used in case a trailing space count counter is larger than a threshold. After 430, method 400 stops.

Figure 11:
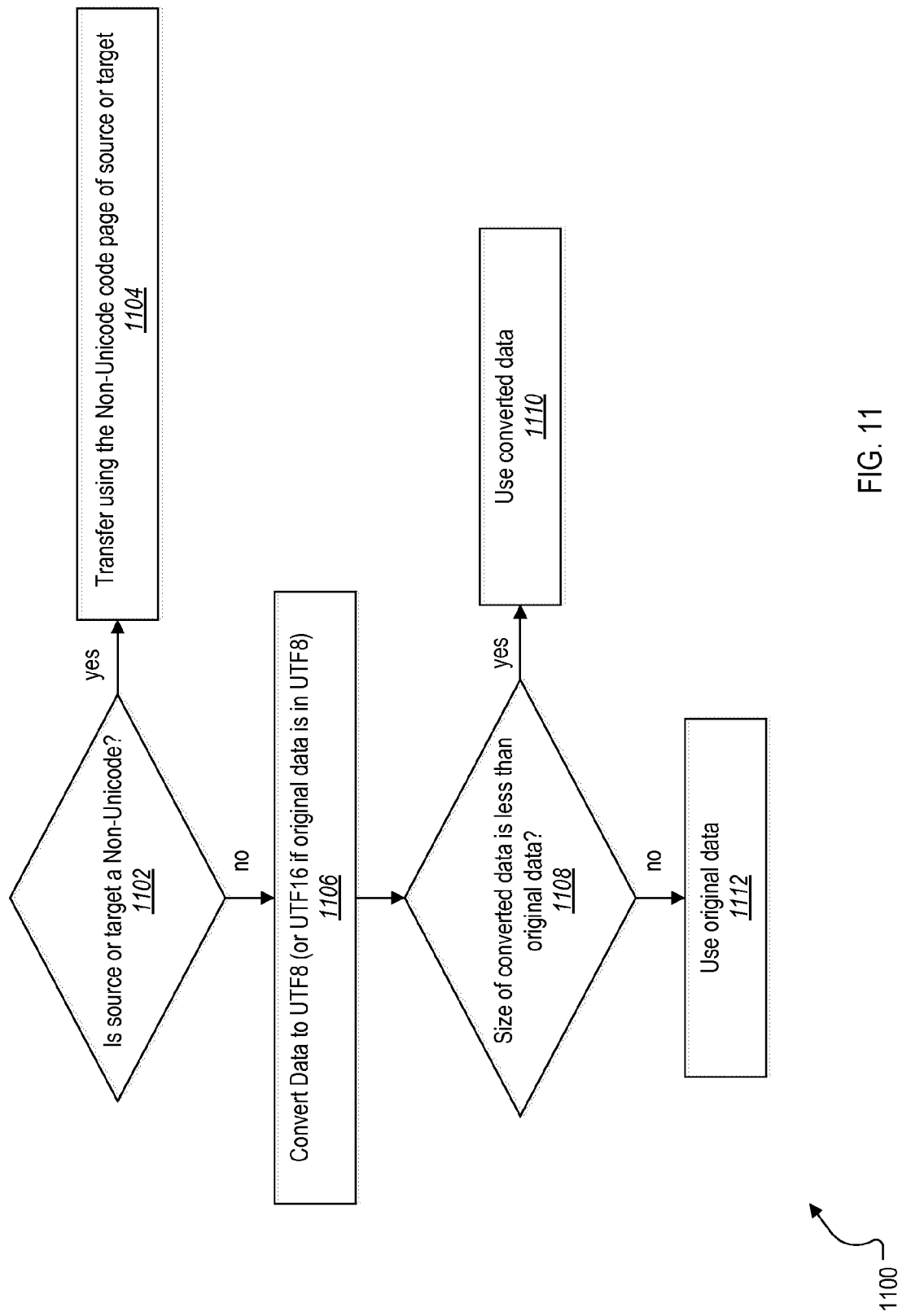
FIG. 11 is a flow diagram of a method illustrating a serialization process based on a character scheme according to an implementation.

If the variable type is integer, method 400 proceeds from 410 to 422. From 422, method 400 proceeds to 432. At 432, an integer scheme can be determined as the variable serialization scheme. FIG. 11 and associated descriptions provide more details on the operation of the character scheme and integer scheme. After 432, method 400 stops.

If the variable type is neither character nor integer, method 400 proceeds from 410 to 424. At 424, other serialization schemes can be determined. After 424, method 400 stops.

Figure 5:
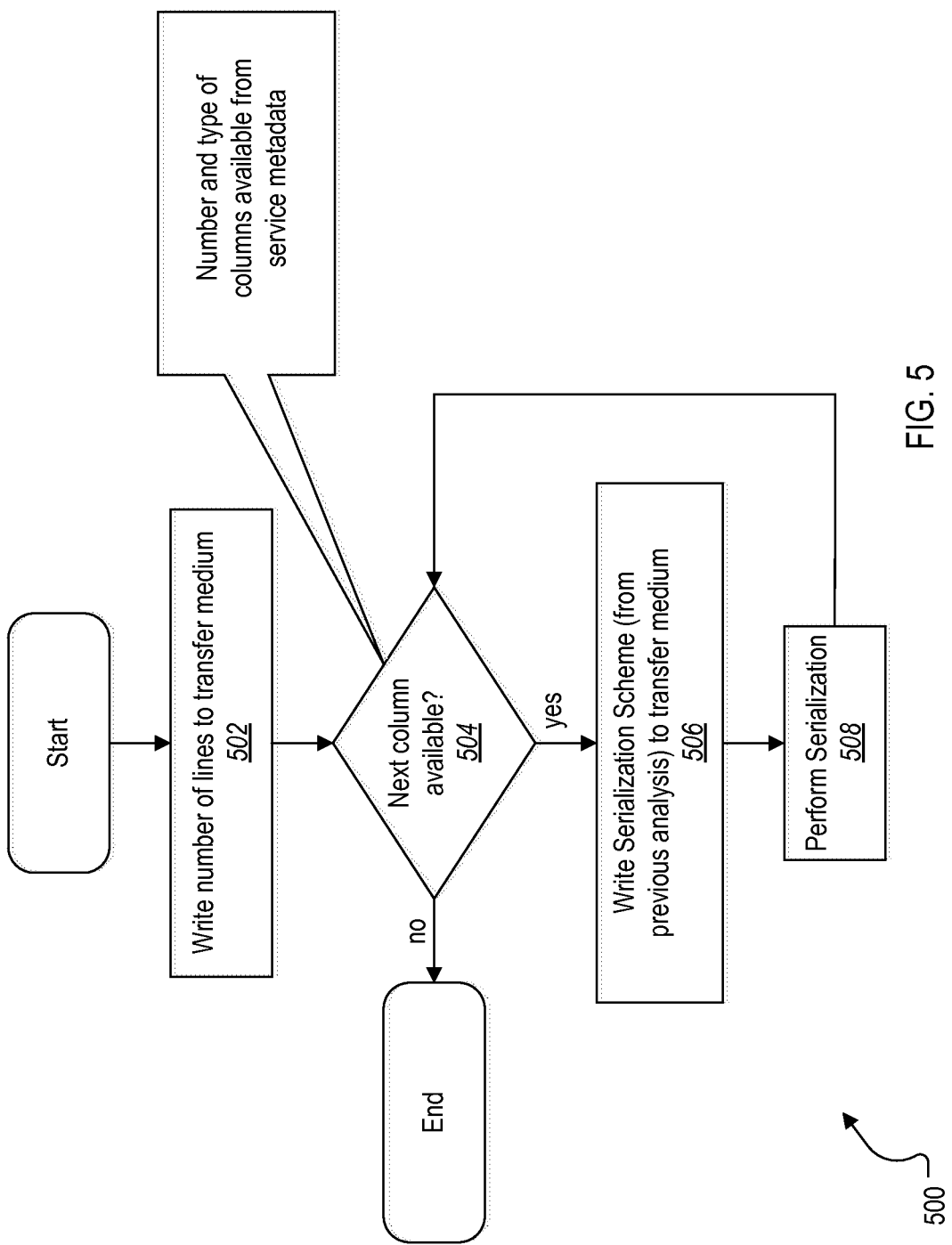
FIG. 5 is a flow diagram of a method illustrating a serialization process according to an implementation.

FIG. 5 is a flow diagram of a method 500 illustrating a serialization process according to an implementation. For clarity of presentation, the description that follows generally describes method 500 in the context of FIGS. 1-4 and 6-11. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, and/or in any order.

At 502, the number of lines of the source database can be written to the transfer medium. From 502, method 500 proceeds to 504. At 504, the availability of the next column can be determined. In some cases, the number of columns and the types of columns of the source database can be determined from service metadata of the column. In some implementations, the service metadata can include the data type of the column, the column offset, and/or the length of the column. The column offset may indicate alignment bytes between the columns. The length of the column may indicate the amount of data stored in the column. If the next column is not available, method 500 stops after 504. If the next column is available, method 500 proceeds from 504 to 506. At 506, the serialization schemes for the column can be written to the transfer medium. In some cases, the serialization schemes can be determined according to the process described in FIGS. 3-4 and associated descriptions. From 506, method 500 proceeds to 508, where serialization can be performed according to the serialization schemes. FIGS. 7-11 provide more details on the operation of the serialization schemes. From 508, method 500 proceeds to 504. Method 500 continues until all the columns in the source database are serialized.

Figure 6:
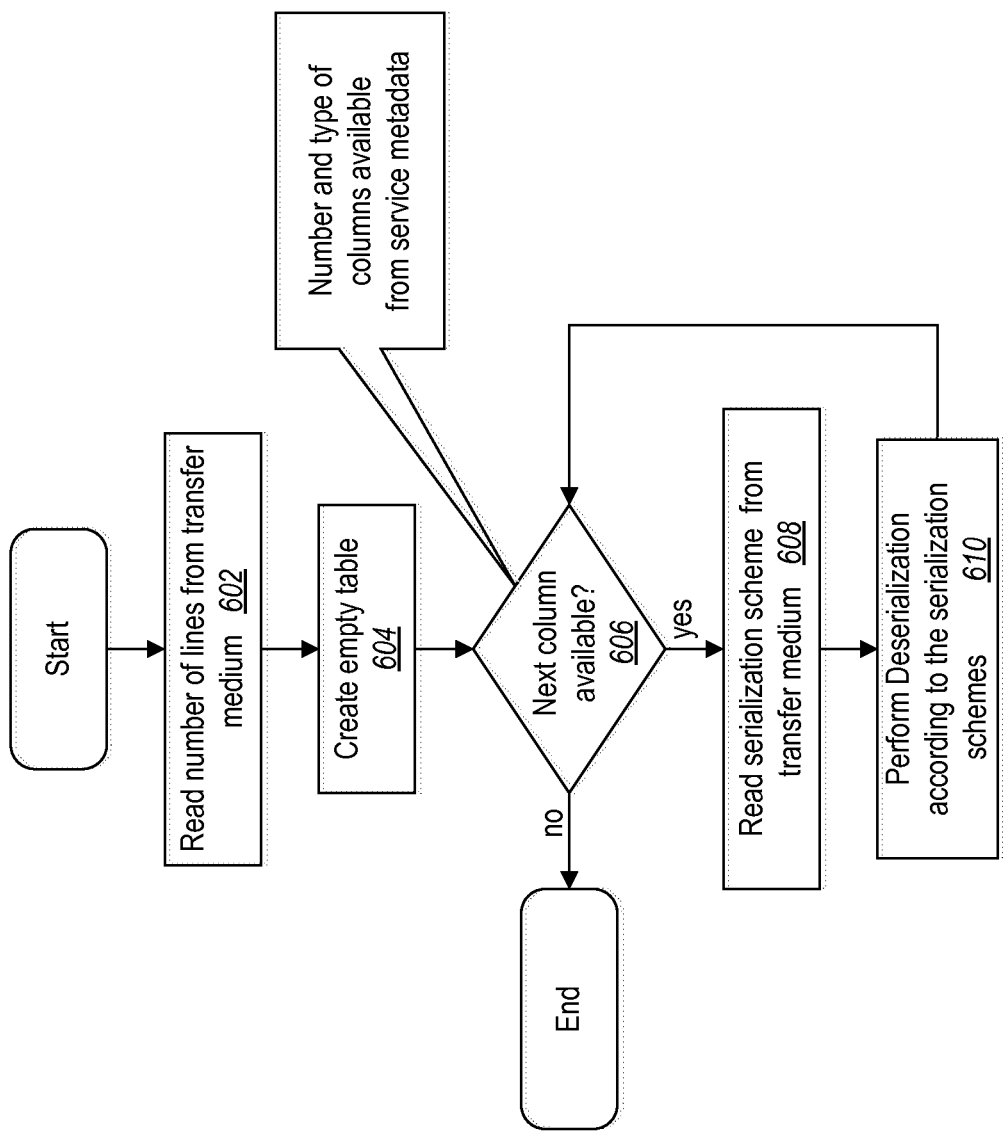
FIG. 6 is a flow diagram of a method illustrating a deserialization process according to an implementation.

FIG. 6 is a flow diagram of a method 600 illustrating a deserialization process according to an implementation. For clarity of presentation, the description that follows generally describes method 600 in the context of FIGS. 1-5 and 7-11. However, it will be understood that method 600 may be performed, for example, by any other suitable system, environment, software, and hardware, or a combination of systems, environments, software, and hardware as appropriate. In some implementations, various steps of method 600 can be run in parallel, in combination, in loops, and/or in any order.

At 602, the number of lines can be read from the transfer medium. From 602, method 600 proceeds to 604. At 604, an empty table in the target database can be created. From 604, method 600 proceeds to 606. At 606, the availability of the next column can be determined. In some cases, the number of columns and the types of columns can be determined from service metadata of the column. If the next column is not available, method 600 stops after 606. If the next column is available, method 600 proceeds from 606 to 608. At 608, the serialization schemes for the column can be read from the transfer medium. From 608, method 600 proceeds to 610, where the deserialization schemes can be performed according to the serialization schemes. FIGS. 7-11 provide more details on the operation of the deserialization schemes. From 610, method 600 proceeds to 606. Method 600 continues until all the columns are deserialized in the target database.

FIG. 7 is a flow diagram of a method 700 illustrating a serialization process based on a replication scheme according to an implementation. The replication scheme can also be referred to as a replication of subsequent values scheme. For clarity of presentation, the description that follows generally describes method 700 in the context of FIGS. 1-6 and 8-11. However, it will be understood that method 700 may be performed, for example, by any other suitable system, environment, software, and hardware, or a combination of systems, environments, software, and hardware as appropriate. In some implementations, various steps of method 700 can be run in parallel, in combination, in loops, and/or in any order.

In some cases, subsequent replication of data values is common in business data. Subsequent replication of data value means that the values in consecutive data entries are the same. When hierarchical data are stored in flat representation, subsequent replication can occur frequently. In some cases, the replication scheme can take advantage of the subsequent replication of data values by storing the data value once, preceded or followed by a counter of the number of subsequent replications. Table 3 represents an example of a table in a source database.

TABLE 3

A Table in a Source Database for Replication Scheme

| Mueller | Berlin | Kurfuerstendamm |
|---|---|---|
| Huber | Berlin | Potdammer Platz |
| Meier | Berlin | Streesemannstrasse |
| Smith | New York | $2^{nd}$ Ave |
| Baker | New York | $74^{th}$ St |
| Miller | New York | Park Ave |
| Brown | New York | Broadway |
| Edwards | Boston | State St |

In the second column of Table 3, the locations "Berlin" and "New York" are examples of subsequent replication of data values. In some implementations, the second column can be serialized using a replication scheme. Table 4 represents an example of the second column serialized using the replication scheme.

TABLE 4

A Serialized Column using Replication Scheme

| Berlin | 3 | New York | 4 | Boston | 1 |
|---|---|---|---|---|---|

In some cases, the column may have no or a few subsequent replications. In these cases, the data amount may be increased due to the additional counters. Therefore, in some cases, the replication scheme may be used when the scheme reduces the data amount to be serialized. In some cases, as described previously in FIGS. 3-4 and associated descriptions, a replication counter can be determined during the analyzing process. The replication counter indicates the number of subsequent replications. In some cases, if the replication counter is larger than a predetermined threshold, the replication scheme can be used. Alternatively or in combination, a calculation can be performed to determine whether the replication scheme may reduce the amount of data. The following inequality equation represents an example of the calculation:

$$L*W > C*R + (L-R)*W,$$

where L=Number of Lines, R=Number of subsequent redundancies, W=field width, and C=counter width.

If the inequality is true, then the replication scheme may reduce the amount of data and therefore can be used for the column.

Referring to FIG. 7, at 702, the Additional Value Count can be set to 0. From 702, method 700 proceeds to 704, where a next value is written to the transfer medium. In some cases, e.g., the first time step 704 is performed for the column, the next value can be the first value in the column. In some cases, e.g., when step 704 is performed after the first time for the column, the next value can be the next value determined at 712. From 704, method 700 proceeds to 706, where the next value in the column can be read and compared to the previous value. If the next value equals the previous value, method 700 proceeds from 706 to 708. At 708, the Additional Value Count can be increased by 1. From 708, method 700 proceeds to 706, where the next value can be read and compared. If the next value does not equal the previous value, method 700 proceeds from 706 to 710. At 710, the Additional Value Count can be written to the transfer medium. From 710, method 700 proceeds to 712, where the availability of the next value in the column is determined. If the next value is available, method 700 proceeds from 710 to 702. If the next value is not available, method 700 stops after 712.

FIG. 8 is a flow diagram of a method 800 illustrating a deserialization process based on a replication scheme according to an implementation. For clarity of presentation, the description that follows generally describes method 800 in the context of FIGS. 1-7 and 9-11. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, and/or in any order.

At 802, the next value can be read from the transfer medium. The next value can be written to the receiving table in the target database. From 802, method 800 proceeds to 804, where the additional Value Count can be read. From 804, method 800 proceeds to 806. At 806, whether the Additional Value Count has been reached can be determined. If the Additional Value Count has not been reached, method 800 proceeds from 806 to 808. At 808, the previous value can be written again to the receiving table in the target database. From 808, method 800 proceeds to 806. If the Additional Value Count has been reached, method 800 proceeds from 806 to 810. At 810, whether end of column has been reached can be determined. If the end of column has not been reached, method 800 proceeds from 810 to 802. If the end of column has been reached, method 800 stops after 810.

FIG. 9 is a flow diagram of a method 900 illustrating a serialization process based on a repetition scheme according to an implementation. The repetition scheme can also be referred to as a repetition of a limited value set scheme. For clarity of presentation, the description that follows generally describes method 900 in the context of FIGS. 1-8 and 10-11. However, it will be understood that method 900 may be performed, for example, by any other suitable system, environment, software, and hardware, or a combination of systems, environments, software, and hardware as appropriate. In some implementations, various steps of method 900 can be run in parallel, in combination, in loops, and/or in any order.

In some cases, if a column includes a limited set of values and the values are not sorted but in an arbitrary order, it may be effective to transfer first all the values in the value set, and then transfer the corresponding index of each value in the value set. Table 5 represents an example column in a source database.

TABLE 5

A Column in a Source Database for Repetition scheme

Red
Yellow
Green
Yellow
Green
Red
Red
Green

There are three values in the value set for this column: "red," "yellow," and "green." A first run over the column can produce the following value set and the corresponding index for each value. Table 6 represents an example of the value set.

TABLE 6

A Value Set

| 0 | Red |
| 1 | Yellow |
| 2 | Green |

Therefore, data in the column of the source database can be serialized by sending the corresponding index for each value in the column. Table 7 represents an example of the serialized table based on the repetition scheme.

TABLE 7

A Serialized Column according to Repetition scheme

| 0 | 1 | 2 | 1 | 2 | 0 | 0 | 2 |

In some cases, the column may have too many values in a value set. In these cases, the data amount may be increased by using the repetition scheme. Therefore, in some cases, the repetition scheme may be used when the scheme reduces the data amount to be serialized. In some cases, as described previously in FIGS. 3-4 and associated descriptions, a repetition counter can be determined during the analyzing process. The repetition counter may indicate the number of different values in the value set. In some cases, if the repetition counter is smaller than a predetermined limit, the replication scheme can be used. The predetermined limit can be set based on the number of bits used for the index of the values in a value set. For example, the predetermined limit can be 256 if 8 bits are used to represent the index of values.

Alternatively or in combination, a calculation may be performed to determine whether the repetition scheme may reduce the amount of data. The following inequality equation represent an example of the calculation:

$$L*W1 > W1*V + L*W2,$$

where L=Number of Lines, V=Number of Values, W1=Field Width, and W2=Width of the index.

If the inequality is true, then the repetition scheme may reduce the amount of data and therefore can be used for the column.

The width of index can be determined based on the number of different values in a value set. For example, if the value set has 4 different values, 2 bits can be used to serialize one index of a data value. With 1 Byte, 4 data values can be serialized. The following equation represents an example calculation of the width of the index:

$$x = \lceil \log_2 n \rceil,$$

where x is the width of the index, and n is the number of values in the value set.

Referring to FIG. 9, at 902, the repetition counter can be written to the transfer medium. From 902, method 900 proceeds to 904, where different values in the value set are serialized. In some cases, other serialization schemes, e.g., variable serialization schemes such as integer schemes or character schemes, can be used to serialize the values in the value set. From 904, method 900 proceeds to 906. At 906, the availability of the next value in the column of the source database can be determined. If the next value is available, method 900 proceeds from 906 to 908, where the corresponding index of the next value can be determined. From 908, method 900 proceeds to 910, where the corresponding index can be written to the transfer medium. From 910, method 900 proceeds to 906. If the next value is not available, method 900 stops after 906.

FIG. 10 is a flow diagram of a method 1000 illustrating a deserialization process based on a repetition scheme according to an implementation. For clarity of presentation, the description that follows generally describes method 1000 in the context of FIGS. 1-9 and 11. However, it will be understood that method 1000 may be performed, for example, by any other suitable system, environment, software, and hardware, or a combination of systems, environments, software, and hardware as appropriate. In some implementations, various steps of method 1000 can be run in parallel, in combination, in loops, and/or in any order.

At 1002, the repetition counter can be read from the transfer medium. From 1002, method 1000 proceeds to 1004, where the possible values in the value set can be deserialized. In some cases, the deserialized values can be stored in an intermediate buffer. From 1004, method 1000 proceeds to 1006. At 1006, the availability of the next value can be determined. If the next value is available, method 1000 proceeds from 1006 to 1008. At 1008, the index of the next field in the column can be read from the transfer medium. In some cases, the width of the index can be determined based on the repetition counter. For example, if the repetition counter is 4, which means that the number of different values in the value set is 4, the width of the index can be determined to be 2. Therefore, the next 2 bits read from the transfer medium represent the index of the value in the next field. From 1008, method 1000 proceeds to 1010. At 1010, the value that corresponds to the index can be obtained from the intermediate buffer. From 1010, method 1000 proceeds to 1012, where the value can be written to the destination field in the target database. From 1012, method 1000 proceeds to 1006. If there is no more next value, method 1000 stops after 1006.

FIG. 11 is a flow diagram of a method 1100 illustrating a serialization process based on a character scheme according to an implementation. For clarity of presentation, the description that follows generally describes method 1100 in the context of FIGS. 1-10. However, it will be understood that method 1100 may be performed, for example, by any other suitable system, environment, software, and hardware, or a combination of systems, environments, software, and hardware as appropriate. In some implementations, various steps of method 1100 can be run in parallel, in combination, in loops, and/or in any order.

In some implementations, different variable serialization schemes can be used based on the types of data in the source database. The data type can be character, integer, or other types.

In some cases, the data type of data stored in database tables, e.g., business data, can be character. In some cases, the character data have fixed length. In some cases, the character data have variable length. Variable length character data may also be referred to as string data. In some implementations, a character scheme can be used to serialize character data. In some cases, a character scheme may include a coding system conversion scheme, a fill character scheme, or a combination of these and other schemes.

In some cases, the coding scheme of the character data can be determined. For example, the coding scheme can be a Unicode system or a Non-Unicode system. There are also several Unicode dialects. Unicode dialects may use at least 1 byte per character, but in most cases more. If either a source database or a target database uses Non-Unicode system, the data can be serialized in Non-Unicode system, because all Non-Unicode code pages use one byte per character.

If both the source database and the target database use a Unicode system, the nature of the character data can be examined to determine which Unicode dialect to be used for serialization. If most of the data are Western characters, UTF8 may be more effective. If the data include some Asian characters, UTF16 may be more effective. In some cases, if the source database or the target database is limited to UCS2, then UCS2 can be used. In some implementations, UCS2 may not be used in other scenarios because UCS2 supports a subset of characters available worldwide. UCS4 or UTF16 cover all characters, even extremely seldom ones, but they may use too many spaces. Therefore, UCS4 or UTF16 can be converted to UTF16 or UTF8 depending on the characters to be transferred (Asian or Western). In some cases, data stored in Asian systems include only Western characters because they are of a technical nature or used in an international context. Therefore, it may be beneficial to examine the nature of the character data.

In some implementations, if the coding scheme is a Unicode system, the count of non-ASCII characters can be compared with a predetermined threshold. If the count of non-ASCII characters is less than the predetermined threshold, UTF8 can be used. Otherwise, UTF16 can be used.

In some implementations, the data can be converted to UTF8. If the converted data has fewer characters than the uncovered, then UTF8 can be used. Otherwise, UTF16 can be used.

The information that the data is coded as UTF8 or UTF16 can also be transferred in addition to the payload. In some implementations, one bit of the existing length information can be used to indicate whether the data is coded as UTF8 or UTF16. In some cases, this approach may be used in combination with the fill character scheme described below.

Fixed-length character fields are usually large enough to store extreme values. Therefore, the fields are usually not completely used (e.g., filled with spaces or Null values). In these cases, a length field can be transferred, followed by the payload characters without the fill characters. Table 8 represents an example of column in a source database.

TABLE 8

A Column in a Source Database for fill character scheme

| B | e | r | l | I | n | | | | |
| N | e | w | | Y | o | r | k | | |
| P | h | i | l | A | d | e | l | p H | i a |
| P | a | r | i | S | | | | | |
| R | o | m | | | | | | | |
| A | t | h | e | N | | | | | |
| I | s | t | a | N | b | u | l | | |

Table 9 represents an example of a serialized column according to a fill character scheme, where a length field is transferred before the payload characters without the fill characters.

TABLE 9

A Serialized Column according to fill character serialization

| 6 B | e r | l i n 8 N | e | w | Y | o | r k 12 | P | h i l a d e l p h |
| i a | 5 P | a r i s 3 | R | o | m 5 | A | t h e | n | 8 I s t a n b u l |

In some implementations, a calculation can be performed to determine whether the fill character scheme may reduce the amount of data. The following inequality equation represents an example of the calculation:

$$L*W>F+C,$$

where L=Number of Lines, W=Field Width, F=Number of Fill Characters, P=Number of Payload Characters. If the inequality is true, then the fill character scheme may reduce the amount of data and therefore can be used for the column.

Referring to FIG. 11, at 1102, whether the source or the target database uses a Non-Unicode system can be determined. If either the source or the target database uses a Non-Unicode system, method 1100 proceeds from 1102 to 1104, where data can be transferred using a Non-Unicode code page of either the target or the source database. Method 1100 stops after 1104. If neither databases uses a Non-Unicode system, method 1100 proceeds from 1102 to 1106. At 1106, data can be converted to UTF8 if the data is not stored in UTF8. In some cases, if the original data is in UTF8, the data can be converted to UTF16. From 1106, method 1100 proceeds to 1108, where the size of the converted data can be compared to the size of the original data. If the size of the converted data is less, method 1100 proceeds from 1108 to 1110, where converted data can be used. Method 1100 stops after 1110. If the size of the converted data is not less, method 1100 proceeds from 1108 to 1112, where original data can be used. Method 1100 stops after 1112.

In some cases, different serialization schemes can be used based on the knowledge of a data type. For example, character data with only numeric content (as NUMC on a SAP ABAP-based System) can be transferred in packed or unpacked BCD code (by using 4 Bits per character). In addition, character data for Date can be transferred into numbers. For example, Month can be stored in 4 bits, Day in 5 bits, and Year in 1 to 16 bits (depending on the minimal and maximal possible year). Additionally, the Year data can be serialized using the integer scheme described below, with the minimal year transferred once per column. Character data for Time can also transferred into numbers. For example, hour can be stored in 5 bits, minutes and seconds in 6 bits. In some cases, Time data can be stored as seconds per day, which uses 17 bits because it ranges from 0 to 86400.

In some implementations, an integer scheme can be used to serialize integer data. For example, if the values in a field range from 1-100000, 5 nibbles can be used to transfer the values in this field. With 5 bytes, 2 numbers can be transferred. Alternatively, 17 bits can be used to transfer the values, so 8 values can be transferred by using 17 bytes. The following equation represents an example calculation to determine the number of bits to transfer an integer value:

$$x = \lceil \log_2(b-a) \rceil,$$

where b=maximal value; a=minimal value; x: number of bits to transfer

In some cases, minimal values less than 0 are subtracted before transmission and added after transmission. In some cases, the minimal and maximum values of the field can be determined in the analyzing process as described in FIGS. 3-4. In some cases, the minimal and maximum values can be determined based on the definition of the field.

In some cases, some columns in the source database may be emptied or limited. In these or other cases, an initial data scheme can be used. Under an initial data scheme, empty data are not transmitted. In some cases, the serialization type can be set to empty, which means that a column is skipped.

In some implementations, more than one serialization scheme can be combined. Table 10 represents an example of available combinations of the serialization schemes, where a check marks an available combination and a cross marks a combination that may not be available.

The following represents an example of a serialization process that reduces the amount of data transferred.

In this example, a company has two locations: Berlin and Philadelphia. The employee table includes one column that stores the location for every employee. The company has 50000 employees. If the location is 40 characters long (on a UTF16 system), without using any serialization scheme, 50000*40*2 Bytes (UTF16)=4000000 bytes of data may be transferred. In this example, the following serialization schemes are used in combination: repetition of a limited value set, serialization based on data types, and converting to UTF8. As a result, the following are the number of data transferred:

1 Byte to describe the serialization schemes used: <repetition of a limited value set> together with <serialization based on data types>.

1 Byte including value 2 as 2 values will follow.

Value 1: 1 Length Byte (with UTF8 Bit set) followed by 12 Bytes: "Philadelphia"

Value 2: 1 Length Byte (with UTF8 Bit set) followed by 6 Bytes: "Berlin"

1 Byte including the amount of bits used to distinguish between the values. Here, 0=Berlin 1=Philadelphia. Therefore, 1 Bit may be enough.

50000*1 Bit to transfer the values in each field: 6250 Bytes

Total: 1+1+1+12+1+6+1+6250=6273 Bytes

Therefore, serialized data is 640 times less than the amount of original data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data

TABLE 10

Combination of Serialization Schemes

| | Column-based transfer of a table | Replications of subsequent Values | Character Scheme | Serialization based on data types | Initial Data | Repetition of a limited value set |
|---|---|---|---|---|---|---|
| Column-based transfer of a table | | ✓ | ✓ | ✓ | ✓ | ✓ |
| Replications of subsequent Values | | | ✓ | ✓ | x | x |
| Character Scheme | | | | x | x | ✓ |
| Serialization based on data types | | | | | x | ✓ |
| Initial Data | | | | | | x |
| Repetition of a limited value set | | | | | | | processing apparatus. The computer storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media, and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user, and a keyboard and a pointing device, e.g., a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in Extensible Markup Language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products. Furthermore, while the operations depicted in the drawings may indicate start and/or end points for the operations, implementations of the methods described in the disclosure are not restricted to the particular start and/or end point as illustrated. Other implementations may start and/or end at different points of the operations.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for improving data transferring efficiency from a first database to a second database, comprising:
    analyzing a column of data stored in the first database to determine at least one serialization parameter, the at least one serialization parameter comprises a repetition counter, a replication counter, or a variable type;
    determining a data serialization scheme associated with the data based on at least one of the repetition count or the replication counter, wherein the data serialization scheme comprises at least one of a repetition scheme or a replication scheme;
    determining a variable serialization scheme associated with the data based on the variable type;
    repeating the analyzing, the determining of the data serialization scheme, and the determining of the variable serialization scheme for each column of the data stored in the first database;
    serializing the data stored in the first database using the data serialization scheme associated with the data and the variable serialization scheme associated with the data; and
    transferring the serialized data to the second database.

2. The method of claim 1, further comprising:
    prior to the analyzing, determining whether the first database is a row-based database; and
    if the first database is row-based, transferring the first database into a column-based database.

3. The method of claim 1, wherein the transferring further comprises:
    compressing the serialized data; and
    transferring the compressed serialized data.

4. The method of claim 1, wherein determining the data serialization scheme further comprising:
- if the repetition counter is smaller than a predetermined limit, determining that the data serialization scheme comprises the repetition scheme; and
- if the repetition counter is greater than or equal to the predetermined limit and the replication counter is larger than a predetermined threshold, determining that the data serialization scheme comprises the republication scheme.

5. The method of claim 1, wherein determining the variable serialization scheme further comprising:
- if the variable type is integer, determining that the variable serialization comprises an integer scheme; and
- if the variable type is character, determining that the variable serialization comprises a character scheme.

6. The method of claim 1, wherein the repetition scheme comprises:
- writing the repetition counter to a transfer medium;
- serializing at least one value in a value set to the transfer medium;
- determining an index that corresponds to a data value; and
- writing the index to the transfer medium.

7. The method of claim 1, wherein the replication scheme comprises:
- setting an additional value counter to zero;
- writing a data value to a transfer medium;
- reading a next data value;
- in response to a determination that the next data value is equal to the data value, increasing the additional value counter by one; and
- writing the additional value counter to the transfer medium.

8. A system for improving data transferring efficiency from a first database to a second database, comprising:
- a memory; and
- at least one hardware processor interoperably coupled with the memory and configured to:
  - analyze a column of data stored in the first database to determine at least one serialization parameter, the at least one serialization parameter comprises a repetition counter, a replication counter, or a variable type;
  - determine a data serialization scheme associated with the data based on at least one of the repetition count or the replication counter, wherein the data serialization scheme comprises at least one of a repetition scheme or a replication scheme;
  - determine a variable serialization scheme associated with the data based on the variable type;
  - repeat the analyzing, the determining of the data serialization scheme, and the determining of the variable serialization scheme for each column of the data stored in the first database;
  - serialize the data stored in the first database using the data serialization scheme associated with the data and the variable serialization scheme associated with the data; and
  - transfer the serialized data to the second database.

9. The system of claim 8, wherein the at least one hardware processor is further configured to:
- prior to the analyzing, determine whether the first database is a row-based database; and
- if the first database is row-based, transfer the first database into a column-based database.

10. The system of claim 8, wherein the transferring further comprises:
- compressing the serialized data; and
- transferring the compressed serialized data.

11. The system of claim 8, wherein determining the data serialization scheme further comprising:
- if the repetition counter is smaller than a predetermined limit, determining that the data serialization scheme comprises the repetition scheme; and
- if the repetition counter is greater than or equal to the predetermined limit and the replication counter is larger than a predetermined threshold, determining that the data serialization scheme comprises the republication scheme.

12. The system of claim 8, wherein determining the variable serialization scheme further comprising:
- if the variable type is integer, determining that the variable serialization comprises an integer scheme; and
- if the variable type is character, determining that the variable serialization comprises a character scheme.

13. The system of claim 8, wherein the repetition scheme comprises:
- writing the repetition counter to a transfer medium;
- serializing at least one value in a value set to the transfer medium;
- determining an index that corresponds to a data value; and
- writing the index to the transfer medium.

14. The system of claim 8, wherein the replication scheme comprises:
- setting an additional value counter to zero;
- writing a data value to a transfer medium;
- reading a next data value;
- in response to a determination that the next data value is equal to the data value, increasing the additional value counter by one; and
- writing the additional value counter to the transfer medium.

15. A non-transitory, computer-readable medium storing computer-readable instructions for improving data transferring efficiency from a first database to a second database, the instructions executable by a computer and configured to:
- analyze a column of data stored in the first database to determine at least one serialization parameter, the at least one serialization parameter comprises a repetition counter, a replication counter, or a variable type;
- determine a data serialization scheme associated with the data based on at least one of the repetition count or the replication counter, wherein the data serialization scheme comprises at least one of a repetition scheme or a replication scheme;
- determine a variable serialization scheme associated with the data based on the variable type;
- repeat the analyzing, the determining of the data serialization scheme, and the determining of the variable serialization scheme for each column of the data stored in the first database;
- serialize the data stored in the first database using the data serialization scheme associated with the data and the variable serialization scheme associated with the data; and
- transfer the serialized data to the second database.

16. The non-transitory, computer-readable medium of claim 15, wherein the instructions are further configured to:
- prior to the analyzing, determine whether the first database is a row-based database; and
- if the first database is row-based, transfer the first database into a column-based database.

17. The non-transitory, computer-readable medium of claim 15, wherein the transferring further comprises:

compressing the serialized data; and transferring the compressed serialized data.

18. The non-transitory, computer-readable medium of claim 15, wherein determining the data serialization scheme further comprising:

if the repetition counter is smaller than a predetermined limit, determining that the data serialization scheme comprises the repetition scheme; and if the repetition counter is greater than or equal to the predetermined limit and the replication counter is larger than a predetermined threshold, determining that the data serialization scheme comprises the republication scheme.

19. The non-transitory, computer-readable medium of claim 15, wherein determining the variable serialization scheme further comprising:

if the variable type is integer, determining that the variable serialization comprises an integer scheme; and if the variable type is character, determining that the variable serialization comprises a character scheme.

20. The non-transitory, computer-readable medium of claim 15, wherein the repetition scheme comprises:

writing the repetition counter to a transfer medium;

serializing at least one value in a value set to the transfer medium;

determining an index that corresponds to a data value; and writing the index to the transfer medium.

* * * * *